Patented Dec. 17, 1935

2,024,382

UNITED STATES PATENT OFFICE 2,024,382

PROJECTION SCREEN AND ALLIED METHODS

David F. Newman, Freeport, N. Y., assignor to Trans-Lux Daylight Picture Screen Corporation, New York, N. Y., a corporation of Delaware No Drawing. Application October 23, 1930, Serial No. 490,818. Renewed May 28, 1935

5 Claims. (Cl. 88—24)

My invention relates to a projection screen, to a method of preparing screen-forming material, and/or to a method of producing a screen.

My invention, in one of its prominent phases, relates to a projection screen formed from a substance such as cellulose-acetate material having incorporated therein or associated therewith one or more agents which determine and/or vary the characteristics of the completed screen.

Further objects, advantages and characteristics of my invention will become apparent from the following detailed description.

My invention resides in the projection screen, methods and features of the character hereinafter described and claimed.

A screen constructed in accordance with my invention is disposed, usually, substantially vertically between an audience and suitable projection mechanism from which emanates a beam of light passing to the eyes of an audience after traversing said screen. The aforesaid projection mechanism may be such, for example, as is coactable with suitable motion picture film bearing representations or pictures through which passes the aforesaid beam of light to effect the display of images of said representations or pictures on said screen.

In accordance with a preferred form of my invention, cellulose-acetate material is utilized as the main screen-forming material or as the base of the screen. In accordance with one important phase of the invention, the cellulose-acetate material is brought to viscous condition in association or combination with a solvent, an agent imparting flexibility to the completed screen, a light-diffusing agent and, if desired, a light-filtering agent.

As stated above, the base of the screen is formed from or constituted by cellulose-acetate. This material may be of flaky character such, for example, as is readily obtained on the market. Or, it may be obtained in any other suitable form.

The material utilized as a solvent may be of any suitable character. It has been demonstrated that acetone, ethyl lactate, and diacetone alcohol are satisfactory although other solvents may be substituted therefor. Preferably, the solvent includes a material or materials of low boiling point and another or others of high boiling point, the quantity of the low boiling point material, by preference, substantially exceeding that of the high boiling point material. In general, the quantity of the solvent substantially exceeds, ordinarily by many times, that of the base material.

To the end that the completed screen may be relatively flexible and not stiff or unyielding, an agent or material producing screen flexibility should be utilized. The material for this purpose may be of suitable character such, for example, as triphenyl phosphate. Castor oil is also suitable; however, preferably it is not used with a solvent such as diacetone alcohol.

The light-diffusing agent has the property of causing the completed screen to properly and adequately diffuse the projected light. A variety of materials are suitable for this purpose such, for example, as zinc oxide, antimony oxide, barium sulfate, titanium oxide, etc., etc. Ordinarily, when the projection is of the "through" character, as noted above, the light-diffusing agent should be used in an amount substantially less than the amount of the cellulose-acetate material.

In order to reproduce the color values of the field being projected with a satisfactory degree of faithfulness, I find it desirable to provide a screen which is neutral or substantially so when acted upon by the light from the projecting light source; inasmuch as this light usually contains an excessive quantity of yellow rays, a filtering agent should be employed. Without the filtering agent, white on the screen appears as a tan color, the other colors being affected in a corresponding manner. Obviously, the character of the source of light is largely controlling but, in general, only a small amount of the light-filtering agent is required in comparison with the amount of the cellulose-acetate material. Cobalt blue (inorganic) is satisfactory for this purpose. Similarly, the organic dyes, specifically Victoria blue base, erioglaucine blue, oil soluble alizarin blue, etc., may be utilized if desired.

Merely by way of one example of my invention and for purposes of explanation, a satisfactory screen composition formula is herewith stated qualitatively and quantitatively as follows:

| | | Grams |
|---|---|---|
| Base | cellulose-acetate | 30 |
| Solvent | acetone | 240 |
| | ethyl lactate | 98 |
| Flexible agent | triphenyl phosphate | 45 |
| Light-diffusing agent | zinc oxide | 10 |
| Light-filtering agent | cobalt blue | 2 |

These materials, proportioned as noted above or otherwise as may be desirable, may be mixed and brought to a homogeneous semi-fluid or viscous condition in any suitable manner. For example, all may be mixed together but a more preferable way involves separate treatment of some of the materials. To this end, the cellulose-acetate, the ethyl lactate and the acetone may be thoroughly mixed together and let set, or agitated, until the cellulose-acetate is thoroughly dissolved. Separately, it is desirable to mix some of the acetone with the triphenyl phosphate. The two substances thus obtained may then be thoroughly mixed together, the zinc oxide and cobalt blue, meanwhile, being added.

The screen-forming operation may be initiated as soon as the cellulose-acetate and the triphenyl phosphate are thoroughly dissolved whereby the resulting mixture is a homogeneous viscous mass. Any suitable method may be practiced for producing the screen. Preferably, however, a molding operation is utilized and this may be as follows:

A suitably dimensioned plate of metal, glass or the like is provided, the top surface of this plate being plane, smooth, etched or corrugated as desired. The plate is provided with a bordering wall of suitable height, as of the order of $\frac{1}{32}$ of an inch, more or less, and the configuration of the space enclosed by this wall determines the initial configuration of the completed screen.

Thereupon, the aforesaid viscous material is poured into the space enclosed by said bordering wall and the excess material suitably removed, as by a straight edge. The screen-forming material is now left alone for a substantial period of time, as for several hours, during which evaporation of the solvent occurs. After the solvent has substantially entirely evaporated, it will be found that the thickness of the remaining material is substantially less than the height of the aforesaid bordering wall. Further, such material has now become sheet-like and it may readily be removed from the plate used in the molding operation. After thus being removed, the aforesaid material inherently retains its sheet-like character and, thereupon, it may be suitably mounted and used as a screen. To thus mount the screen, a suitable binding may be cemented thereto and this may be laced or otherwise suitably secured in a supporting frame. If desired, evaporation of the solvents as described above may be accelerated by suitably elevating the temperature of the viscous material.

A screen constructed in accordance with my invention is very efficient for the purpose intended, particularly because it is flexible and may readily be rolled up. The images appearing thereon are sharp, definite and readily observable. A formula of the character hereinbefore stated, produces a screen highly satisfactory for "rear" projection or projection of that character wherein the screen is between the audience and the projection mechanism. Under some circumstances, however, a screen as thus produced may be used for "front" projection or projection of that character wherein the projection mechanism and the audience are on the same side of the screen, the light being reflected to the audience by the screen. When the screen is intended to be used in a front projection system, the amount of the light-diffusing agent should be greatly or substantially increased, while maintaining the remaining formula ratio substantially as stated. The degree of opacity desired generally governs the amount of said light-diffusing agent to be utilized. Thus, for example, a satisfactory front projection screen results when 75 parts by weight of the light-diffusing agent is utilized for each 100 parts of the base material.

It shall be understood that my invention is not to be limited to the precise method hereinbefore described and that other methods may be practiced to produce the screen. Thus, for example, a sheet of the desired dimensions may be produced by treatment of the aforesaid viscous material in the manner customary in connection with the preparation of sheets of ordinary cellulose-acetate. Or, if desired, the aforesaid viscous material may be rendered plastic and then molded under pressure to produce a screen of the desired thickness and size. In lieu of such operations, the aforesaid plastic material may be rolled for screen-forming purposes. Or, said viscous material may be treated in any other suitable manner to bring it to sheet-like configuration.

In accordance with another phase of my invention, ordinary cellulose-acetate material may be brought to sheet-like configuration in any suitable manner and thereafter the light-diffusing agent may be sprayed or painted thereon, the same being also true of the light-filtering agent should the use thereof in this manner be desirable.

Still further, in accordance with my invention, the cellulose-acetate material during the pressing operation bringing it to sheet-like configuration, may be roughened or corrugated on one or both surfaces whereby the completed sheet exhibits suitable light-diffusive characteristics. Or, if desired, the formed sheet of cellulose-acetate material may be mechanically treated, as by a sand-blasting operation, to render the sheet properly light-diffusive.

Accordingly, by my invention, a product well known to the commercial world, by treatment in one manner or another, is made available for projection screen purposes. Primarily, by my invention, the cellulose-acetate material is so treated that the screen is substantially uniformly illuminated by the projecting source of light. In other words, the cellulose-acetate screen material, when produced in accordance with my invention, is of such character that the "lens spot" screen effect is largely or substantially eliminated whereby the screen functions in a highly satisfactory and efficient manner.

The completed screen should be so formed that at least one surface thereof is dull in contradistinction to shininess and this dull surface should face the audience so as to avoid specular reflections being transmitted to the audience.

It shall be distinctly understood that, from its broad concept, my invention is not to be limited to the use of all of the agents hereinbefore described and that some of them may be omitted, if desired, while others may be substituted therefor, if desired.

Under some circumstances, it may be desirable for the completed screen to include a suitable sheet of fabric, as one that is formed from strands, cross-wise or otherwise related. This fabric may be a sheet of georgette silk or the like from which foreign matter such as gums, resins and the like have been suitably removed, the sheet preferably being stretched on a suitable open frame and then associated with the viscous material on the aforesaid plate in suitable manner, for example, as disclosed in U. S. Letters Patent to A. C. Payne No. 1,715,381. Or the fabric sheet may be associated with the screen-forming material in any other suitable manner.

While the invention has been described with respect to certain particular preferred examples which give satisfactory results, it will be understood by those skilled in the art, after understanding the invention, that various changes and modifications may be made without departing from the spirit and scope of the invention and it is intended therefore in the appended claims to cover all such changes and modifications.

What is claimed as new and desired to be secured by Letters Patent is:

1. A projection screen comprising a sheet-like body formed principally from cellulose-acetate material, an agent incorporated in said body for imparting flexibility to the completed screen, and a light-diffusing agent substantially uniformly incorporated in said body, the quantity of said light-diffusing agent being approximately predetermined whereby a substantial amount of light traverses the screen when it is included in a rear projection system.

2. A projection screen comprising a sheet-like body formed principally from substantially homogeneous cellulose-acetate material, an agent incorporated in said body for imparting flexibility to the completed screen, and substantially uniformly distributed light-diffusing means on the exterior surface of the cellulose-acetate material for rendering the entire area of said screen suitably light-diffusive for rear projection practice.

3. A projection screen comprising a sheet-like body formed principally from substantially homogeneous cellulose-acetate material, an agent incorporated in said body for imparting flexibility to the completed screen, a sheet of fabric associated with said cellulose-acetate material, and substantially uniformly distributed light-diffusing means on the exterior surface of the cellulose-acetate material for rendering the entire area of said screen suitably light-diffusive for rear projection practice.

4. A projection screen comprising a sheet-like body formed principally from cellulose-acetate material, an agent incorporated in said body for imparting flexibility to the completed screen, a sheet of fabric associated with said cellulose-acetate material, and a light-diffusing agent substantially uniformly incorporated in said body, the quantity of said light-diffusing agent being approximately predetermined whereby a substantial amount of light traverses the screen when it is included in a rear projection system.

5. A projection screen comprising a sheet-like body formed principally from cellulose-acetate material; an agent incorporated in said body for imparting flexibility to the completed screen, a light-diffusing agent substantially uniformly incorporated in said body, and substantially uniformly distributed light-diffusing means on the exterior surface of the cellulose-acetate material for rendering the entire area of said screen suitably light-diffusive for rear projection practice, said light-diffusing agent and said light-diffusing means being approximately predetermined in a quantitative manner whereby a substantial amount of light traverses the screen when it is included in a rear projection system.

DAVID F. NEWMAN.